INVENTOR.
Bertram A. Von Schoppe

United States Patent Office 3,359,939
Patented Dec. 26, 1967

3,359,939
HOT MELT APPLICATOR
Bertram A. Von Schoppe, Watertown, Mass., assignor to Compo Shoe Machinery Corporation, Waltham, Mass., a corporation of Delaware
Filed July 9, 1965, Ser. No. 470,748
19 Claims. (Cl. 118—12)

ABSTRACT OF THE DISCLOSURE

An applicator of the kind comprising an applicator roll rotating in a recess with a part projecting therefrom, a supporting roll supported in confronting relation to the projecting portion of the applicator roll for holding a workpiece in engagement with the applicator roll, and a pump for supplying molten adhesive to the portion of the roll in the recess from a heated chamber closely adjacent thereto.

---

Fast setting adhesives are desirable for the foregoing and similar operations and it is a principal purpose of this invention to provide means for supplying molten adhesive of the quick-setting character rapidly enough to meet the demands without having to premelt large quantities of such adhesive thereby avoiding the difficulty of deterioration and, in fact, enabling the use of adhesives which have not been available heretofore because of their short pot life. Other objects are to provide an applicator for progressively melting adhesive from a solid body of adhesive as it is required such as a block, rod, stick, ribbon, or the like; to provide apparatus for accommodating rods or sticks of different cross-section within limits; to provide an applicator in which the rate of delivery may be varied to increase or decrease the quantity applied at any given time; to provide apparatus in which the volume of molten adhesive left at any given time between successive periods of operation is small and can be cleared from the apparatus by passing a single workpiece or a piece of waste material through the apparatus; to provide an apparatus in which the thickness of the adhesive layer applied may be closely controlled; to provide an apparatus in which greater continuity of the adhesive at the outer edge of the layer for sole attaching operations is available; and to provide apparatus in which there is no bleed or drip when the work is removed. Still further objects are to provide an apparatus in which the solid adhesive may be maintained substantially rigid up until the time of its melting to assist in feeding; to provide an apparatus which may be easily converted to the use of granulated adhesive or premelted adhesive; and to provide an apparatus which is comparatively simple in its make-up, easy to maintain and keep clean and is especially adapted for use with work-feeding mechanism wherein the margin of the work to which the adhesive is to be applied is moved progressively and continuously relative to the applicator or transfer roll by cross-feeding means.

As herein illustrated, the apparatus has a pump chamber for holding liquid adhesive for delivery in determinable quantity to an applicator or transfer roll and there is means for delivering the adhesive in predetermined quantity from the pump chamber to the transfer roll. The pump chamber has inlet and outlet openings and the means for effecting delivery of the adhesive in predetermined amount, as herein illustrated, is a gear pump mounted in the pump chamber with its rotors rotating away from each other at the inlet side of the pump chamber. In one form of the apparatus a solid rod or stick of adhesive is moved through the inlet into engagement with the oppositely rotating surfaces of the rotors and as the end of the adhesive stick melts, the liquid adhesive is carried by the rotors from the inlet side of the chamber to the outlet side thereof. There is means for moving the adhesive rod into the inlet pump chamber comprising a pair of opposed rolls movable relative to each other to receive between them the rod to be advanced into the pump chamber. One, at least, of the feed rolls is yieldable relative to the other, is mounted on a carriage which is slidable to enable retracting it from the other for introducing a rod between the rolls and is yieldingly held engaged with a rod situated between them during feeding by a compression spring. The feeding means includes a sizing die having an opening through which the rod is advanced to the pump chamber, one end of which is adjacent the feed rolls and is of large enough cross-section to receive a rod of greater cross-section than the inlet to the pump chamber, and the other end of which is adjacent the inlet and corresponds in cross-section thereto. The sizing die tapers progressively in cross-section from the end adjacent the feed rolls to the end adjacent the pump chamber and there is means for heating the sizing die sufficiently to enable reshaping of the rod as it passes therethrough to change its cross-section to a size corresponding to that of the pump chamber without melting and without destroying the stiffness of the rod, so that the feeding force applied to the rod by the feed rolls is effective in forcing the reshaped portion thereof into the pump chamber. A non-conductive guide tube is interposed between the die and the pump chamber to conduct the reshaped rod to the pump chamber while protecting it from the ambient atmosphere and from heat from both the sizing die and from the pump chamber. The block contains a recessed applicator or transfer roll rotatably mounted in a recess spaced from the pump chamber with a portion projecting therefrom for transferring adhesive supplied to a portion within the recess to a workpiece held against the lower projecting peripheral edge thereof. A passage extends from the discharge opening in the pump chamber to the recess so as to deliver adhesive to the portion of the applicator which is rotating downwardly toward the open side of the recess and there is a valve in the passage operable to close it. The latter passage is relatively short so that the quantity of adhesive left between the valve and the recess when the valve is shut off is insignificant and the transfer roll is mounted eccentrically within the recess so that the surface moving into the recess, after being stripped of adhesive by contact with the work, is spaced from the entrance to the recess so that any adhesive left on the surface is returned to the recess without drip or bleed. There are heating elements mounted in the block for keeping the block, rotors and applicator disc heated. A supporting work feed roll operates in conjunction with the applicator to advance the work relatively to a pair of guides in cross-feed fashion and there is means for rotating the feed roll at a constant speed. The speed of the pump and feed rolls are variable.

Although the apparatus is designed especially to melt adhesive progressively from an end of a stick, rod or strip of solid adhesive, it can be adapted to use granular adhesive or premelted adhesive.

The invention will now be described in greater detail with reference to the accompanying drawings wherein.

Figures 5, 6, 7:
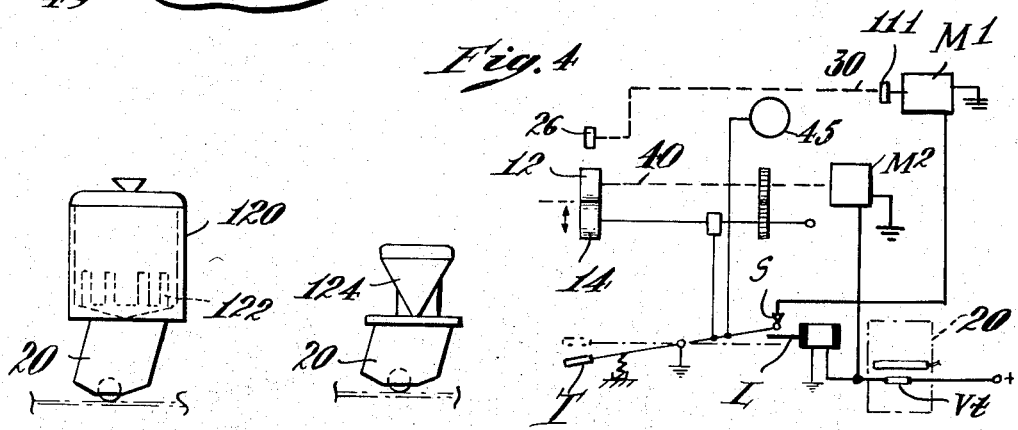
FIG. 5 is a modification for melting block adhesive.
FIG. 6 is a modification for melting granulated adhesive.

FIG. 7 diagrammatically illlustrates the treadle and interlock.

Figure 2:
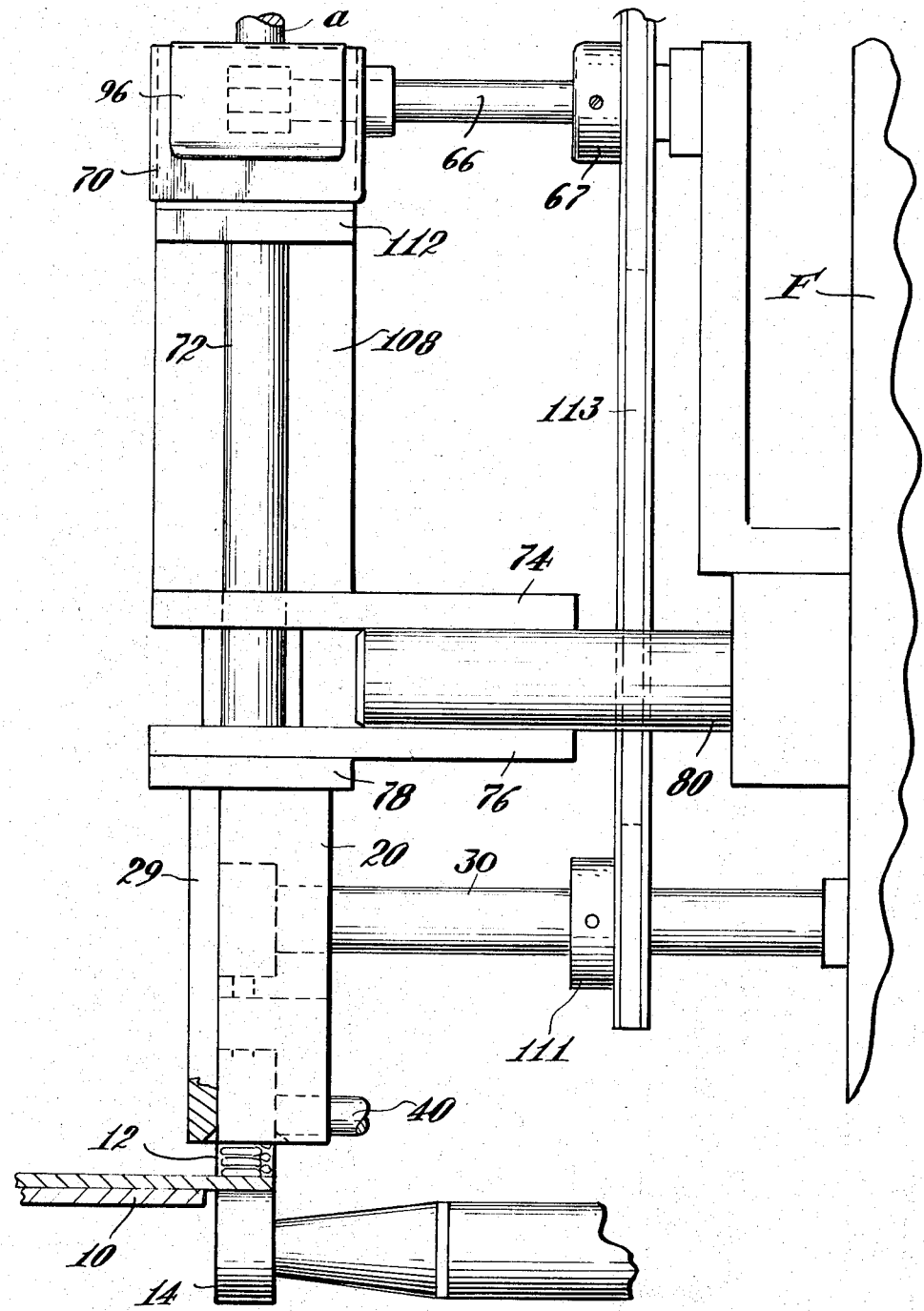
FIG. 2 is a side elevation as seen from the right-hand side of FIG. 1.

The applicator, as herein illustrated, is designed to apply a narrow band *b* or layer of adhesive to the margin of a sole member (FIG. 4) for attaching the latter to the bottom of a lasted upper or other workpiece, for example to a part which is to have an edge folded on itself and is of the kind wherein the workpiece is placed on a table 10 (FIG. 2) and advanced substantially automatically by the combined action of an applicator or transfer disc 12 and a feed roll 14 relative to a pair of guide members 16 and 18, so positioned as to produce a cross-feed which automatically turns the edge of the workpiece as it is advanced so as to apply adhesive to a part or the entire marginal edge thereof without the necessity of guidance on the part of the operator. Such feeds are conventional in the art and accordingly need not be described further herein.

Since the apparatus is especially designed for applying adhesive to the margin of precut or premolded outsoles, the outer surfaces of which have already been finished, the feed roll 14 is preferably comprised of a yieldable non-metallic material such as polyvinyl chloride or other plastic which will not scar or mark the finished surface of the sole.

Figure 1:
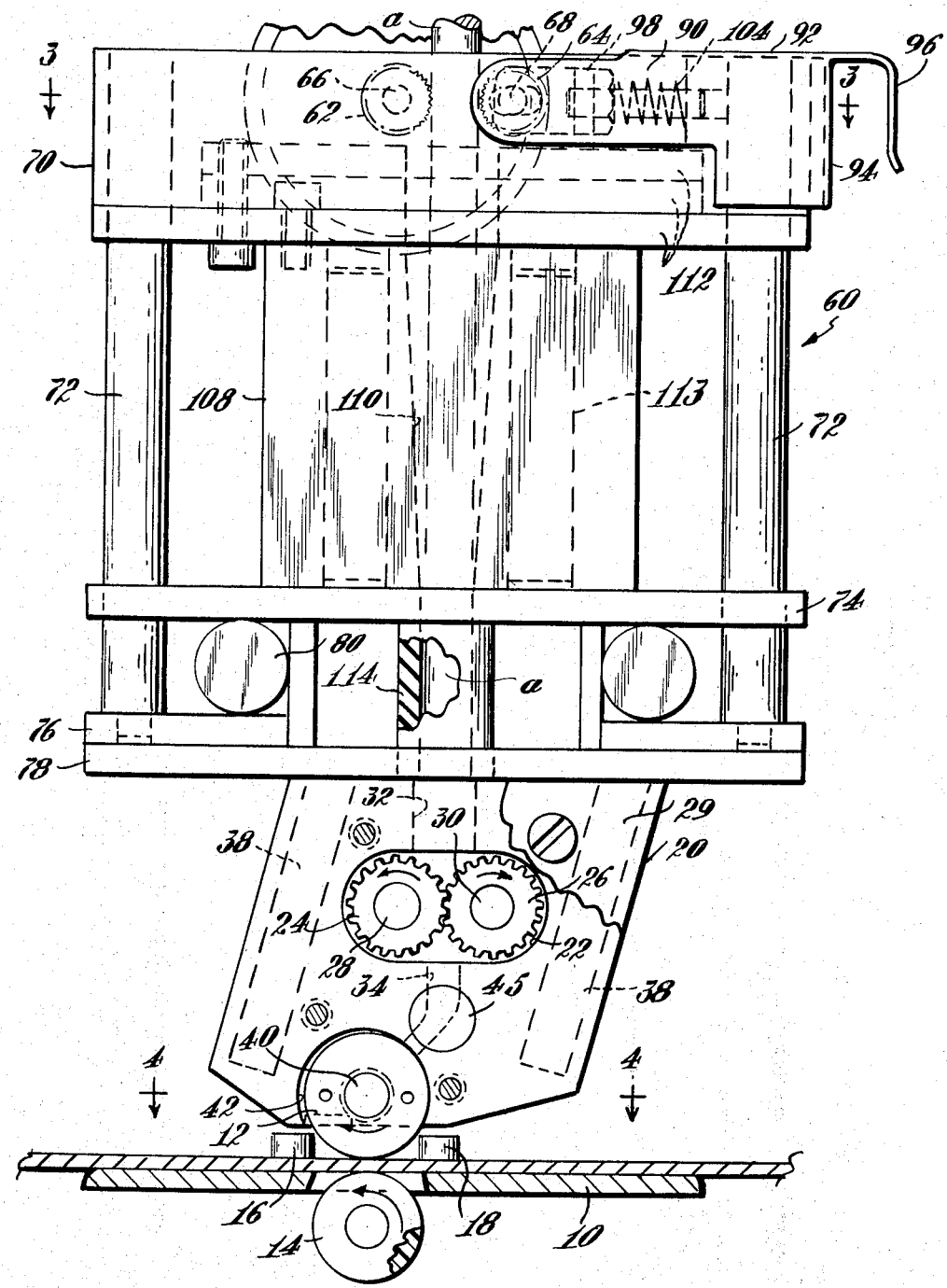
FIG. 1 is a front elevation of the applicator, sectioned in part, and with the front plate of the pump chamber broken away to show the pump, valve and applicator disc in elevation.

As heretofore pointed out, it is desirable to supply the adhesive in small quantities so that it will be used up before it has time to deteriorate and become less effective as an adhesive and yet fast enough to enable applying the adhesive uniformly with an automatic self-feeding machine such as referred to above. This is achieved herein by provision of a block 20 (FIG. 1) which contains a pump chamber 22 in which there are rotatably mounted a pair of toothed rotors 24 and 26. The chamber 22 is formed in one face of the block 20 (FIG. 2), the rotors 24 and 26 are mounted on shafts 28 and 30 journaled in the opposite face of the block and extending into the chamber and a cover plate 29 is bolted to the one face of the block to cover the rotors and close the chamber 22. There is an inlet passage 32 extending from the upper end of the block into the chamber and an outlet passage 34 extending from the bottom of the chamber. The toothed rotors mesh and the shaft 30 is driven in a clockwise direction facing the machine, as shown in FIG. 1, so that the peripheral toothed edges of the rotors move in opposite directions, that is, away from each other with reference to the inlet passage 32. The rotors, in effect, constitute a gear pump which enables controlling the quantity of adhesive delivered at any given time to the outlet side of the pump chamber by controlling the rate of rotation of the rotors. A pair of heating elements 38 are inserted in drilled holes in the block to provide heat for melting and maintaining the adhesive in molten condition within the chamber 22 and during its passage from the chamber to the applicator 12.

The applicator 12 is recessed into the lower end of the block 20 with its lower side projecting therefrom for contact with work held up to it by the feed roll 14. The applicator is a roll having a comparatively narrow peripheral edge (FIG. 2) and is mounted for rotation on a shaft 40 so that its peripheral edge surface is eccentric with respect to the inner surface 42 of the recess. The eccentric mounting of the roll is such that the upgoing peripheral edge of the roll, that is, the side entering the recess, is spaced therefrom sufficiently so that adhesive left on the surface will not be wiped off as the surface enters the recess and hence cause drip or bleed. Preferably the eccentricity is such that the gap between the surface of the upgoing side of the roll and the inside surface of the recess tapers from the entrance of the recess progressively to a point just beyond the top of the roll on the downgoing side. To prevent corresponding drip at the sides, that is, where the side surfaces of the roll enter the recess, the inner surfaces of the sides of the recess are beveled or sloped so as to be downwardly divergent as shown in section in FIG. 2. The outlet passage 34 is arranged to enter the recess at the upper part of the roll where its surface and the surface of the recess merge and a valve 45 is mounted in the block within the outlet passage so as to shut off the flow of adhesive from the pump chamber to the recess when the machine is stopped. The valve 45 is located close to the recess so that only a very small portion of the passage 34 is situated between the valve and the recess.

The applicator roll itself (FIG. 4) is designed to apply a very uniform layer of adhesive to the work to enable controlling the thickness of the layer within about a thousandth of an inch of that desired and, in particular, to apply adhesive along the outer edge of the band which is laid down, for example, on an outsole, which is substantially continuous, that is, so that there is no break in the adhesive along this edge which might interfere with a continuous bond between the outsole and the upper of a shoe to which it was later attached. This is achieved by providing the peripheral surface of the applicator roll (FIG. 4) with a plurality of peripherally spaced, transversely extending elongate depressions 46 between which there are lands 48. The depressions terminate short of the opposite sides of the roll so that they form pockets in the surface closed at their ends. The ends of the pockets at one side of the roll terminate further from that side than the other ends and there are additional depressions 50 of circular shape located at the ends of the lands and between the ends of the lands and the edge of the roll. As thus constructed, when the applicator roll rotates in the recess the depressions 46 and pockets 50 pick up from the end of the passage 34, which enters the recess, adhesive and carry it around into contact with the work forming thereon a ribbon *b* of adhesive (FIG. 4) which comprises spaced parallel ribs 49 which, at their outer ends, that is, adjacent the edge of the sole, are joined by a substantially continuous zigzag rib 51. A secondary substantially straight rib 53 extends from rib-to-rib inwardly of the rib 51, supplementing the rib 51, and providing, in conjunction therewith, a substantial concentration of adhesive adjacent the margin of the sole. The areas between ribs are relatively thinly coated with adhesive as compared to the ribs 49, 51 and 53.

Figure 4:
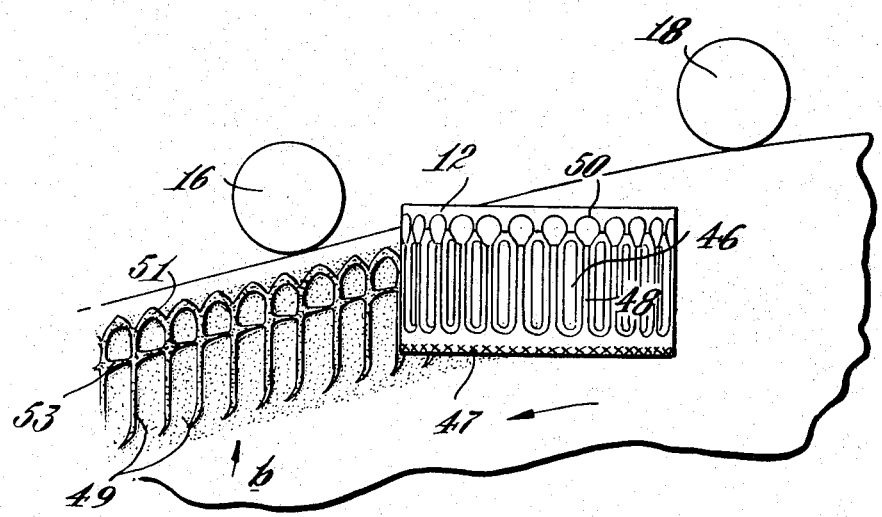
FIG. 4 is a horizontal section taken on the line 4—4 of FIG. 1.

As previously mentioned, it is possible to adjust the feed of the pump, that is, to increase or decrease the adhesive supplied by it to the applicator roll, sufficiently critically to enable controlling the thickness of the adhesive within about a thousandth of an inch of that desired. This is made possible in part by changing the rate of rotation of the rotors 24, 26, and in part to the relatively small quantity of adhesive that is carried by the surface of the applicator roll at any given time. To further insure even distribution of the adhesive on the surface of the work, the inner edge of the applicator roll is provided with notches or serrations 47, as shown in FIG. 4, which are adapted to bite into the surface of the work and prevent slippage between the surface of the applicator and the surface of the work.

Stick, rod or strip adhesive in solid form is supplied by different manufacturers in different cross-section and even when produced by one manufacturer, the cross-section varies appreciably throughout its length hence making it difficult to feed it into the inlet passage 32 of the pump chamber 22. Accordingly, in another aspect of this invention, there is provided feeding means for delivering adhesive to the pump chamber to accommodate adhesive of different cross-section, within reasonable limits, and to reshape the adhesive without completely melting it so that it can be advanced uninterruptedly into the inlet passage 32 of the pump chamber.

Figure 3:
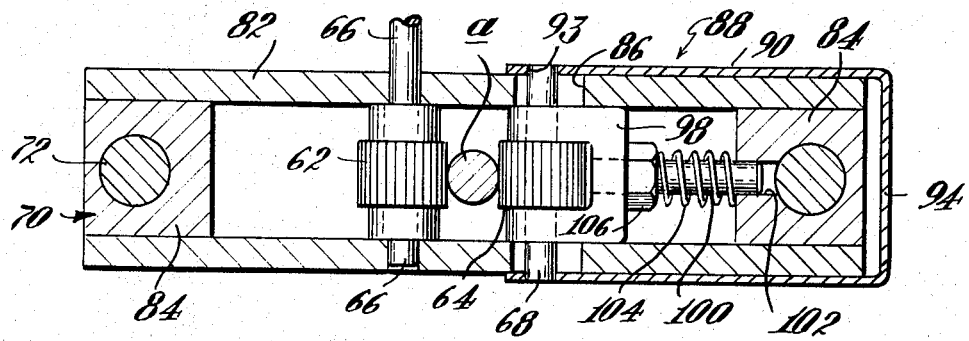
FIG. 3 is a horizontal section taken on the line 3—3 of FIG. 1.

The feeding means 60 (FIGS. 1 and 3) is mounted on the block 20 and comprises a pair of toothed feed rolls 62 and 64 supported on shafts 66 and 68 journaled in a frame 70. The frame 70 is supported on the upper ends of a pair of posts 72—72, the lower ends of which extend through a rigid plate 74 into the forward ends of plates 76—76 secured to a narrow bar 78 fastened to the upper end of the block 20. The forward ends of a pair of rods 80—80 are welded or otherwise fastened to the plate 74 and the plates 76—76 and support the entire structure on the frame F of the cross-feed machine with the applicator roll 12 directly above the feed roll 14. The frame 70 is made up of spaced parallel plates 82—82 (FIG. 3) fastened at their opposite ends to blocks 84—84 bored to receive the upper ends of the posts 72—72. The feed rolls 62, 64 are mounted on shafts 66, 68 between the plates 82—82. The shaft 66 extends rearwardly through the rear one of the plates 82 into a bearing on the frame F of the machine and has on it a sprocket or pulley 67. The shaft 68 is movable longitudinally of the frame in elongated slots 86—86 and is supported for movement in the slots by a carriage 88 mounted on the end of the frame. The carriage is channel-shaped having spaced parallel side walls 90—90, a top wall 92 and an end wall 94 and slidably fits over the end of the frame so that its side walls extended along the outer sides of the plates 82—82. There are holes 93—93 in the side walls in which the ends of the shaft 68 are mounted. A lip 96 extends downwardly from the top wall 92 parallel to the end wall 94 which may be grasped to move the carriage and hence the feed roll 64 away from the feed roll 62 to enable inserting an end of a stick, rod or strip of adhesive between them for feeding. The shaft 68 has on it within the block a yoke piece 98 which straddles the feed roll 64 to which there is fastened one end of a rod 100. The opposite end of the rod is slidably supported in a hole 102 in the block 84. A compression spring 104 is mounted on the rod 100 with one end bearing against the block 84 and its other end against a lock nut 106 by means of which the rod is fixed to the yoke. The spring operates to press the feed roll 64 toward the feed wheel 62 so as to provide a positive feed for the adhesive.

Since, as pointed out, the cross-section of the adhesive may vary in size and shape, a sizing die 108 is mounted between the feed rolls and the pump chamber. The die, as shown (FIG. 1), contains a tapering passage 110 which at the end adjacent the feed roll is sufficiently large to accommodate adhesive having the largest cross-section expected to be encountered and at the end adjacent the pump chamber corresponds in cross-section to the cross-section of the inlet passage 32. The passage intermediate these ends tapers progressively and uniformly. The sizing die 108 is mounted between the frame 70 and the plate 74, preferably with several layers of insulation 112 between its upper end and the feed rolls. Heating cartridges 113—113 inserted in holes in the sizing die provide for warming the adhesive sufficiently during its passage through the die to enable reshaping it so that it will pass freely through the inlet passage 32 of the pump chamber.

The adhesive must not be allowed to become softened to such an extent that it will buckle and hence not feed and the insulation referred to prevents the heat supplied to the sizing die from being conducted to the feed rolls. In order to keep the temperature of the sizing die uniform and substantially constant and to prevent the heat from the pump chamber from being transmitted thereto, the plate 78 is comprised of insulating material and an insulating sleeve 114 is interposed between the plate 78 and the plate 74. The inside diameter of the sleeve corresponds in diameter to the inlet passage 32 so that the reshaped adhesive in passing to the inlet passage 32 is protected from the ambient atmosphere and is kept relatively cool.

In the operation of the apparatus the adhesive $a$ is advanced by the feed rolls 62, 64 through the sizing die 108 where it is reshaped if it is oversized and forced into the inlet passage 32 against the upper surface of the rotors 24, 26. The pump chamber 22, as previously stated, is heated and, by conduction, the rotors are also heated so that when the advancing end of the adhesive is pressed against the rotors it melts and by the combination of melting and attrition or grinding produced by the rubbing action of the teeth on the softened end, is carried from their upper sides around their outer sides between them and the ends of the chamber 22 to their lower sides where it is discharged through the outlet 34 and if the valve 45 is open to the applicator 12.

The shaft 30 to which the rotor 26 is secured is driven by a variable speed motor M1 (FIG. 7) mounted in the machine frame and has on it a sprocket or pulley 111. A chain or belt 113 is entrained about the sprocket or pulley 111 and about the sprocket or pulley 67, so that rotation of the shaft 30 effects a corresponding rotation of the shaft 66. By changing the size of the sprockets or pulleys the speed of the rotors and of the feed rolls may be made the same or may be made different. The rate of rotation of the shaft 30 may also be increased or decreased relative to the rotation of the shaft 40 which preferably is rotated at a constant speed by a motor M2 (FIG. 7). The lowering of the feed roll 14 automatically stops the motor M1 which drives the shaft 30 so that the rotors 24, 26 and feed rolls 62, 64 stop. The work-feeding roll 12 and the operator is required to step down on a treadle T and to hold the treadle down to raise and hold the roll 14 in driving engagement opposite the applicator roll 12. There is a mechanical connection between the treadle T and the valve 45 so that stepping down on the treadle opens the valve 45 and closes a switch S which starts the motor M1 to which the drive shaft 30 is connected thereby starting rotation of the rotors 24, 26 and feed rolls 62, 64. There is an interlock in the heating circuit for the pump chamber which prevents depression of the treadle T and hence raising the roll 14 into operative position until the adhesive in the pump chamber is in a molten condition. This may be accomplished by employing a thermal switch $Vt$ in the circuit and locating it in the pump chamber and a solenoid-operable latch L situated adjacent the treadle operable to prevent lowering it until the latch is withdrawn.

As heretofore pointed out, the apparatus may be modified to enable the use of granulated or particulate adhesive, large blocks of solid adhesive or liquid adhesive. To provide for a large solid block of adhesive, the feed and sizing structure supported by the plate 78 is removed from the upper end of the block 20 and a receptacle 120 (FIG. 5) containing a bottom opening is mounted on the upper end of the block. The receptacle is of rectangular configuration and has at its bottom a plurality of upstanding, spaced parallel ribs 122 upon which a block of adhesive may be supported for melting so that the melted adhesive will flow through the bottom opening into the inlet 32 in the block 20. Suitable heating elements are mounted in the walls and bottom of the box for effecting melting.

It is entirely possible to use an adhesive, liquid at room temperature by pouring the latter into the receptacle 120 as shown in FIG. 5, or by employing a receptacle with a flat bottom and hole in registration with the passage 32.

Granulated adhesive may be employed by using a funnel 124 (FIG. 6) in place of the receptacle, the lower end of which projects into the inlet passage 32. The granulated adhesive is merely poured into the upper end of the funnel and will feed automatically as it is melted upon entering the pump chamber.

In each of these modifications the advantages obtained by the use of the pump and transfer roll described above are available.

It should be understood that the present disclosure is for the purpose of illustration only and that this invention includes all modifications and equivalents which fall within the scope of the appended claims.

I claim:
1. In an apparatus for applying molten adhesive by means of a rotating transfer roll, a heat-conductive block containing a chamber for holding a body of liquid adhesive, a recess in said block for supporting a transfer roll with a portion in the recess and a portion projecting therefrom, said recess and said chamber being closely adjacent and the block containing heating elements located in transversely spaced relation so that the chamber and recess are situated between them, a transfer roll supported in said recess, a short passage connecting the chamber and recess through which adhesive from the chamber is deliverable to the transfer roll, and means in the chamber for transferring liquid adhesive in controllable amounts from the chamber to the recess.

2. Apparatus according to claim 1, wherein said means for transferring liquid adhesive from the chamber to the recess is a pump in the chamber operable to deliver adhesive in controllable amounts from the chamber to the recess.

3. Apparatus according to claim 1, comprising means for supplying adhesive to the inlet of the pump chamber.

4. Apparatus according to claim 1, wherein said means for transferring liquid adhesive from the chamber to the recess is a gear pump mounted in said chamber.

5. Apparatus according to claim 4, comprising means for varying the rate of rotation of the gear pump relative to that of the transfer roll.

6. Apparatus according to claim 1, comprising a valve in said passage, means for effecting constant rotation of the transfer roll, a work feed roll for holding the work to which adhesive is to be applied engaged with the transfer roll, and means operable concomitantly with the elevation of the work-feeding roll to open the valve.

7. Apparatus according to claim 6, characterized in that the passage containing the valve is short and the valve is located close to the end of the passage entering the recess so that only a small quantity of adhesive remains between the valve and the transfer roll when the valve is closed.

8. Apparatus according to claim 6, characterized in that there is a treadle operable to raise the work feed roll into operative position, a latch for preventing operation of the treadle for lifting the transfer roll into operative position, and a switch operable when the adhesive in the chamber becomes molten to retract said latch.

9. Apparatus for supplying adhesive to a transfer roll comprising a block into which a part of the transfer roll is recessed and from which another part projects, said block containing a chamber for holding molten adhesive, rotors in the chamber rotatable in directions away from each other at the top of the chamber and toward each other at the bottom of the chamber, an outlet passage at the bottom of the chamber extending from the bottom of the chamber to the portion of the transfer roll recessed into the block, a valve in said passage, means for effecting continuous rotation of the transfer roll, other means for effecting rotation of the rotors, said chamber, rotors, passage, valves, recess and roll being maintained at a substantially uniform temperature by means of heating elements mounted in the block in spaced confronting relation to said components and to each other, a work-feeding roll supported for movement from an inoperative position below the transfer roll to an operative position in which it holds the work against the transfer roll, a treadle for lifting the work feed roll to said operative position, and means operable by actuation of the treadle to initiate operation of the rotors and to open said valve.

10. Apparatus according to claim 1, wherein said transfer roll is eccentrically mounted in the recess with the peripheral surface of the side moving into the recess spaced from the confronting wall of the recess at the entrance thereto.

11. Apparatus according to claim 1, wherein said recess has spaced parallel flat walls adjacent the side faces of the transfer roll and a curved wall confronting the edge face of the transfer roll, said curved wall being eccentric with respect to the edge face of the transfer roll and the roll being supported with the peripheral portion of its edge surface travelling into the recess spaced from the entrance thereto by the amount of the eccentricity.

12. Apparatus according to claim 1, wherein said recess has spaced parallel flat walls adjacent the side faces of the transfer roll and a curved wall confronting the edge face of the transfer roll, the curvature of the curved wall being such that there is a gap between the edge face and the curved wall at the side of the recess where the edge face is travelling inwardly with respect to the open side of the recess, said gap tapering from a maximum at the entrance to concentricity where the edge face commences to travel outwardly from the recess.

13. Apparatus according to claim 1, wherein said recess has spaced parallel flat walls adjacent the side faces of the transfer roll and a curved wall confronting the edge face of the transfer roll, said curved wall being eccentric with respect to the edge face of the transfer roll and the roll being supported with the portion of its edge face travelling into the recess spaced from the entrance, and the lower inside surfaces of the side walls forwardly of the center of rotation of the transfer roll at the side of entrance of the side surfaces into the recess being downwardly divergent.

14. Apparatus according to claim 1, comprising a motor operably connected to the transfer roll for effecting rotation thereof, a motor operably connected to the pump to effect operation of the pump, and thermal means operative until the temperature of the pump chamber and transfer roll are high enough to melt the adhesive to prevent operation of the motors.

15. In an apparatus for applying adhesive by means of a rotating transfer roll, a block containing a recess adapted to receive the upper part of a transfer roll, a transfer roll, means supporting the transfer roll in the recess, a pump chamber in the block, a passage connecting the recess to the pump chamber, a pump in the pump chamber for delivering liquid adhesive from the pump chamber to the recess in controllable amounts, means situated in the block for heating the entire block to a temperature to maintain the adhesive molten in the chamber, recess and connecting passage during operation of the apparatus, motor for driving the pump, a motor for driving the applicator roll, a support movable from a position spaced from the applicator roll to a position to hold a workpiece engaged therewith, and means operable by movement of the support into operative position to initiate operation of the motor which drives the pump.

16. Apparatus according to claim 15, wherein the support is a rotatable roll.

17. Apparatus according to claim 15, wherein a treadle is operably connected to the support to move it into operative position.

18. Apparatus according to claim 15, wherein there is thermally-responsive means operative to prevent operation of the treadle until the temperature of the part is sufficiently high to insure a molten condition of the adhesive in the pump and on the applicator roll.

19. Apparatus according to claim 15, in which the motor for driving the pump is a variable speed motor to enable varying the speed of the pump relative to the applicator roll.

References Cited

UNITED STATES PATENTS

| | | | |
|---|---|---|---|
| 2,726,629 | 12/1955 | Paulsen | 118—202 |
| 2,783,735 | 3/1957 | Paulsen | 118—202 X |
| 2,787,241 | 4/1957 | Kelly | 118—7 |
| 2,824,541 | 2/1958 | Paulsen. | |

CHARLES A. WILLMUTH, *Primary Examiner.*

R. I. SMITH, *Assistant Examiner.*